United States Patent
McClintock et al.

(10) Patent No.: US 9,558,053 B1
(45) Date of Patent: Jan. 31, 2017

(54) COMPUTER SYSTEMS MONITORING USING BEAT FREQUENCY ANALYSIS

(71) Applicant: Amazon Technologies, Inc., Seattle, WA (US)

(72) Inventors: Jon Arron McClintock, Seattle, WA (US); Tushaar Sethi, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 14/752,445

(22) Filed: Jun. 26, 2015

(51) Int. Cl.
  *G06F 11/30* (2006.01)
  *G06F 11/07* (2006.01)
  *G06F 11/34* (2006.01)

(52) U.S. Cl.
  CPC ....... *G06F 11/0754* (2013.01); *G06F 11/0721* (2013.01); *G06F 11/34* (2013.01); *G06F 11/3051* (2013.01); *G06F 11/3068* (2013.01)

(58) Field of Classification Search
  CPC ....... G06F 11/32; G06F 11/321; G06F 11/323; G06F 11/34; G06F 11/3477; G06F 11/3051; G06F 11/3068; G06F 11/3065
  See application file for complete search history.

(56) References Cited

U.S. PATENT DOCUMENTS

| | | | | |
|---|---|---|---|---|
| 7,613,576 | B2* | 11/2009 | Gross | G06F 11/00 324/628 |
| 2007/0101202 | A1* | 5/2007 | Garbow | G06F 11/008 714/47.2 |
| 2009/0019318 | A1* | 1/2009 | Cochrane | G06F 11/0715 714/47.2 |
| 2013/0318607 | A1* | 11/2013 | Reed | G06F 11/3062 726/23 |
| 2014/0115398 | A1* | 4/2014 | Pnueli | G06F 11/14 714/37 |
| 2014/0298099 | A1* | 10/2014 | Tan | G05B 19/406 714/37 |
| 2016/0162383 | A1* | 6/2016 | Blocher | G06F 11/16 714/47.2 |
| 2016/0203036 | A1* | 7/2016 | Mezic | G06F 11/079 714/819 |

\* cited by examiner

*Primary Examiner* — Joseph Schell
(74) *Attorney, Agent, or Firm* — Davis Wright Tremaine LLP

(57) ABSTRACT

A monitoring service receives, from a variety of hardware components of a set of computer systems, binary signals indicative of operation of these components. The monitoring service determines, based at least in part on these signals, a set of beat frequencies for pairings of hardware components of the set of computer systems. The monitoring service uses this set of beat frequencies, as well as information included in a profile for the set of computer systems, to determine whether there is any indication of anomalous behavior in operation of the set of computer systems. If so, the monitoring service generates one or more alerts indicating the anomalous behavior.

20 Claims, 8 Drawing Sheets

US 9,558,053 B1

COMPUTER SYSTEMS MONITORING USING BEAT FREQUENCY ANALYSIS

BACKGROUND

Monitoring services often evaluate data from a variety of computer systems and hardware components of these computer systems to identify anomalous signals that may serve to indicate an issue with these computer systems or hardware components. However, identifying anomalous signals from a large amount of data obtained from these computer systems and hardware components presents various challenges. For instance, for modern monitoring services, it may be difficult to determine which data streams are important, how they relate to each other, and determine what in the data streams indicate an anomaly. Additionally, in order to reduce the impact of these anomalies, the monitoring services need to be able to identify anomalies in an expeditious manner.

BRIEF DESCRIPTION OF THE DRAWINGS

Various embodiments in accordance with the present disclosure will be described with reference to the drawings, in which.

DETAILED DESCRIPTION

Figure 1:
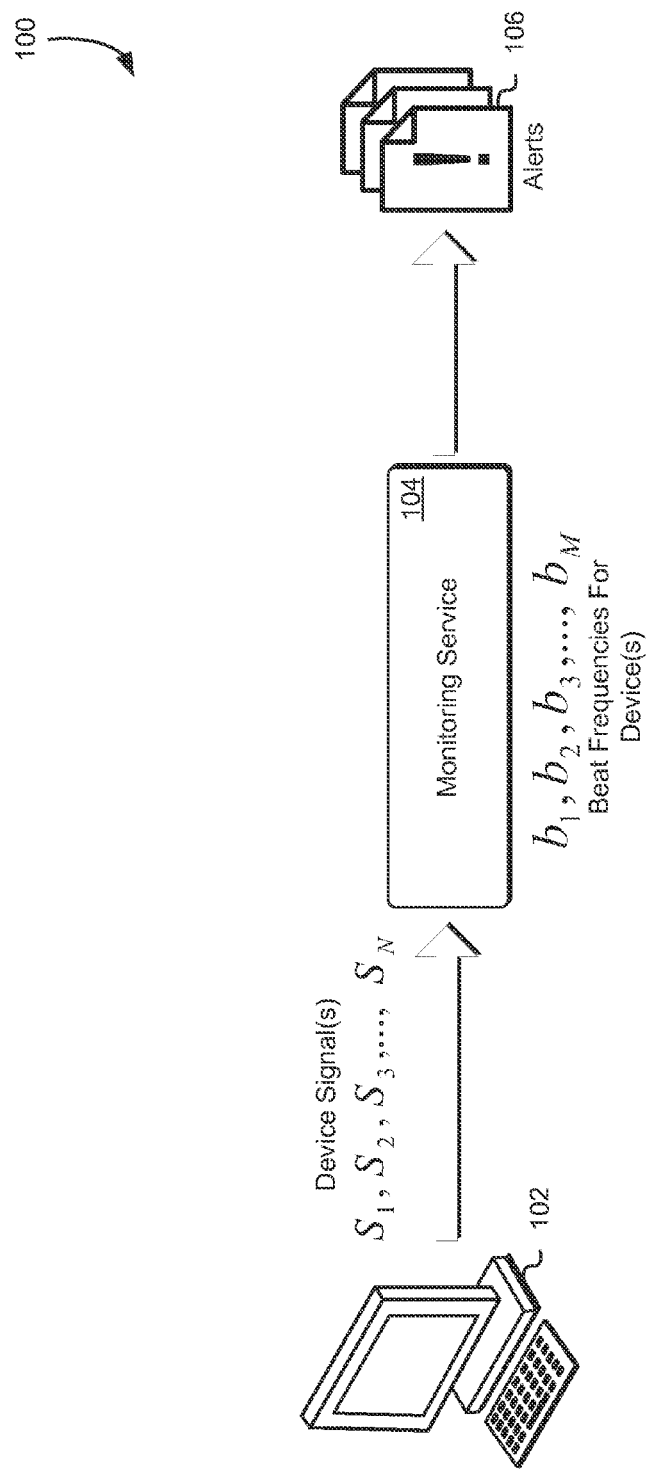
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for monitoring computer systems include identifying anomalous behavior of computer systems and hardware components of these computer systems using beat frequency analysis of signals obtained from these computer systems. Hardware components of computer systems generate signals when in operation. For instance, a storage device (e.g., hard drive, etc.) may perform various read or write operations over a period of time. These operations over this period of time result in a signal that may be recorded for later analysis. Similarly, network devices (e.g., wireless adapters, modems, etc.) generate signals as data is transferred from these network devices and data is received by these network devices. The computer system that includes these devices may record these signals for delivery to a monitoring service to determine anomalous behavior within the computer system. In some instances, customers of the monitoring service may define a group of computer systems or hardware components of various computer systems that are to be analyzed to determine anomalous behavior of the group.

When the monitoring service obtains these signals from the computer system or group of computer systems, the monitoring service utilizes a Fourier transform on individual signals to obtain signal frequencies for each obtained signal. For instance, the monitoring service may utilize a Fourier transform (e.g., discrete Fourier transform, fast Fourier transform, etc.) to determine, for a signal, the frequencies for the signal. The monitoring service then uses these frequencies to calculate an average frequency for the signal. Alternatively, the monitoring service may identify peak frequencies from the transformation and obtain an average frequency from just these peak frequencies. Once the monitoring service has determined the average frequencies for the computer system or for the group of computer systems, the monitoring service may calculate a variety of beat frequencies for pairs of average frequencies. For example, if the computer system being analyzed includes a storage device, a processor, and a network device, the monitoring service may generate beat frequencies for the pairing of the storage device to the processor, the storage device to the network device, and the processor to the network device.

The monitoring service maintains a profile for the computer system or group of computer systems. This profile includes reference beat frequencies for the computer system or group of computer systems that may be used to analyze the obtained beat frequencies. Further, the profile may include statistical data based on the reference beat frequencies. This statistical data may also be used in the analysis of the obtained beat frequencies. For instance, the monitoring service may utilize standard deviations for the reference beat frequencies to determine whether the difference between the reference beat frequencies and the obtained beat frequencies is within these standard deviations or a multiple of the standard deviations. The profile may further specify patterns for the reference beat frequencies that may be used to analyze the obtained beat frequencies. These patterns may specify whether the reference beat frequencies are classified as deterministic or non-deterministic, whether the reference beat frequencies are steady or erratic over time, and the like.

Using the profile for the computer system or group of computer systems, the monitoring service may evaluate the obtained beat frequencies against the reference beat frequencies to identify any anomalies in operation of the computer system or group of computer systems. For instance, if the any of the obtained beat frequencies lie outside of the standard deviations computed based on the reference beat frequencies, the monitoring service may identify an anomaly with the corresponding pair of hardware components used to generate the beat frequency if a beat frequency is outside of the determined standard deviations for the reference beat frequencies. If the monitoring service determines that an anomaly has been detected based on the analysis of the obtained beat frequencies, the monitoring service may transmit a notification to an administrator of the affected computer system to indicate that an anomaly has been detected for the computer system. This may enable the user of the computer system to investigate the anomaly further and correct any issues that may be present.

In this manner, the monitoring service may utilize beat frequencies to identify anomalies in the operation of computer systems or groups of computer systems. In addition, computer system monitoring using beat frequencies provide additional technical advantages related to problems arising out of computer technologies. For example, because, the monitoring service maintains a profile for the computer system, the monitoring service can update the profile based on newly obtained signals from the computer system that do not result in identification of an anomaly. The monitoring service may thus develop a better reference for determining anomalous behavior of the computer system or group of computer systems over time, thereby improving the accuracy of detection while preventing false-positive indications of anomalous behavior.

FIG. 1 shows an illustrative example of an environment 100 in which various embodiments can be implemented. In the environment 100, a computer system 102 transmits one or more device signals to a monitoring service 104 for analysis and anomaly detection. The computer system 102 may include one or more hardware components, which may generate these one or more device signals through performance of one or more operations. For instance, the computer system 102 may include one or more storage devices configured to perform seeks to record and obtain data in response to requests from other components and applications of the computer system 102. The computer system 102 may record these seeks over time for the one or more storage devices, which may result in generation of a signal corresponding to the one or more storage devices. Similarly, if the computer system 102 includes one or more network devices for transmitting and receiving data through a communications network to other computer systems, the computer system 102 may record each received and transmitted packet to generate signals for these one or more network devices.

As the computer system 102 obtains various signals from the hardware components of the computer system 102, the computer system 102 may transmit these signals to a monitoring service 104. The monitoring service 104 may include one or more computer systems configured to obtain signals from various computer systems and other devices (e.g., smartphones, smart watches, tablet computers, etc.) to identify anomalous behavior of these computer systems and devices. When a computer system 102 is initially activated, the computer system 102 may transmit signals for the various hardware components of the computer system 102 to the monitoring service 104 to generate a profile for the computer system 102. This profile may be used to establish a reference for evaluation of future signals received from the computer system 102 for anomaly detection.

In an embodiment, when the monitoring service 104 receives these initial signals from the computer system 102, the monitoring service 104 aggregates these signals according to the hardware component that generated each signal and to the computer system 102 that provided the initial signals. For instance, the monitoring service 104 may assign an identifier to each hardware component and computer system in order to catalog the signals according to these identifiers for future reference or to identify any information associated with the hardware components and computer system within the profile. Once the monitoring service 104 aggregates these signals based at least in part on the originating computer system 102 and the corresponding hardware components, the monitoring service 104 may store these signals within a signal datastore for further processing and analysis. In various embodiments, the aggregator utilizes a discrete Fourier transform or a fast Fourier transform to convert the aggregated signals into one or more frequencies for each hardware component of the computer system 102 for a particular time window. These one or more frequencies are then stored within the signal datastore for further processing and for performing anomaly detection.

The monitoring service 104 may obtain these frequencies from the signal datastore and determine, for individual hardware components of the computer system 102, an average frequency for the hardware component. For instance, the monitoring service 104 may utilize the complete Fourier transform of the hardware component signal to identify a number of peak frequencies identified through the Fourier analysis. The monitoring service 104 may utilize these peak frequencies to obtain a mean frequency for the hardware component. Alternatively, if the Fourier transform results in a number of peak frequencies, the monitoring service 104 may observe these peak frequencies over time to identify the most stable (e.g., constant over time) peak frequency. For example, over time data may be collected to identify a peak. A frequency range around the peak may be determined, such as by using the full width at half maximum or another heuristic for determining a range around a peak. Different time windows may be used to determine statistics about the peak, such as mean value and standard deviation or values based thereupon. Note that, if sampling over discrete time intervals to determine the statistics, the monitoring service may count the number of times that a peak frequency (or range of peak frequencies) is above a particular threshold (with the range being over the threshold if all frequencies in the range are above the threshold). If the statistics indicate stability (e.g., the standard deviation is within a threshold), a peak frequency from the current data (i.e., from frequencies obtained from the signal datastore) falling within the frequency range may be selected. Alternatively, the data over time may be observed to determine a set of peak frequencies. A range around the highest strength peak (e.g., determined by full width at half maximum) may be used to select a frequency from the frequency data store because, e.g., the frequency falls in the range.

In an embodiment, the monitoring service 104 identifies, based at least in part on obtained set of frequencies for an aggregated signal, one or more characteristic frequencies that may be used in determining any anomalies associated with the computer system 102. For instance, the one or more characteristic frequencies may include peak frequencies for the signal, absent frequencies for the signal, or certain levels of variation of frequencies for the signal. These characteristic frequencies may be utilized to calculate a plurality of beat frequencies, as will be described below, for anomaly detection. Note that the monitoring service 104 may select multiple frequencies for a single signal and use each of the multiple selected frequencies to calculate a beat frequency. In other words, two different frequencies from a single signal may be used to calculate beat frequencies using frequencies from other signals or even beat frequencies within the same signal.

Once the monitoring service 104 has identified the average frequency for each hardware component of the computer system 102, the monitoring service 104 may determine for pairs of hardware components of the computer system 102 a set of beat frequencies For instance, if the computer system 102 has provided signals for a data storage device, a network device, and a Universal Serial Bus (USB) device, the monitoring service 104 may generate a beat frequency for a data storage device to network device pair, a data storage device to USB device pair, and a network device to USB device pair. The monitoring service 104 may store these beat frequencies within a profile for the computer system 102, which may be utilized to determine whether subsequent signals indicate anomalous behavior. As new beat frequencies are calculated for the computer system 102, the monitoring service 104 may update the profile to include these new beat frequencies. Additionally, the monitoring service 104 may utilize these beat frequencies over time to identify one or more patterns for these beat frequencies, which may be utilized to identify anomalous behavior. Further, the monitoring service 104 may utilize these beat frequencies to obtain statistical data for the computer system 102. For instance, the monitoring service 104 may calculate, for a set of reference beat frequencies within the profile, standard deviations for beat frequencies of a hardware component pair and/or variances for the beat frequencies of the hardware component pair.

When, at a later time, the monitoring service 104 receives a new set of signals for hardware components of the computer system 102, the monitoring service 104 may aggregate these signals and, for each hardware component, perform a Fourier analysis to obtain the signal frequencies for the hardware component. The monitoring service 104 may determine, based at least in part on the Fourier analysis, an average frequency for each hardware component being analyzed to identify anomalous behavior in operation of the computer system 102. The monitoring service 104 may utilize these average frequencies to calculate beat frequencies for each hardware component pair of the computing device 102. The monitoring service 104 may compare these calculated beat frequencies to the reference beat frequencies within the profile to determine whether there is an indication of anomalous behavior. For instance, for each beat frequency, the monitoring service 104 may determine whether the difference between the calculated beat frequency and the corresponding reference beat frequency is greater than the standard deviation for the reference beat frequency. If so, this may indicate anomalous behavior for the computer system 102. Alternatively, the monitoring service 104 may utilize the calculated beat frequencies to identify a pattern associated with the computing device 102. The monitoring service 104 may compare this pattern to the one or more reference patterns within the profile to determine whether the calculated beat frequencies fail to follow the one or more reference patterns.

If the monitoring service 104 determines, based at least in part on analyses of the calculated beat frequencies against the reference beat frequencies in the profile for the computer system 102, that there is an indication of anomalous behavior, the monitoring service 104 may generate one or more alerts 106. These alerts 106 may indicate that the monitoring service 104 has identified characteristics of the signals that may be indicative of anomalous behavior. The monitoring service 104 may transmit these alerts 106 to the computer system 102 or to an administrator/owner of the computer system 102. This may enable the computer system 102 or the administrator/owner of the computer device 102 to further evaluate the computer system 102 and/or the hardware components of the computer system 102 to identify the source of the anomalous behavior. Alternatively, the monitoring service 104 may transmit the one or more alerts 106 to a security service (not shown), which may quarantine the computer system 102 by preventing data to be obtained from the computer system 102 or data to be transmitted to the computer system 102. The security service may perform additional tests on the computer system 102 to identify the source of the anomalous behavior and perform one or more actions to address the issue.

If the calculated beat frequencies for the computer system 102 are not indicative of anomalous behavior, the monitoring service 104 may store these beat frequencies within the profile for the computer system 102. Additionally, the monitoring service 102 may update the statistical data and patterns for the beat frequencies of the computer system 102 to incorporate these newly calculated beat frequencies. This may enable the monitoring service 104 to continuously update the information within the profile to more accurately identify anomalous behavior of the computer system 102, as newly obtained beat frequencies may be utilized to converge on a solution or better identify patterns of behavior for the computer system 102.

Figure 2:
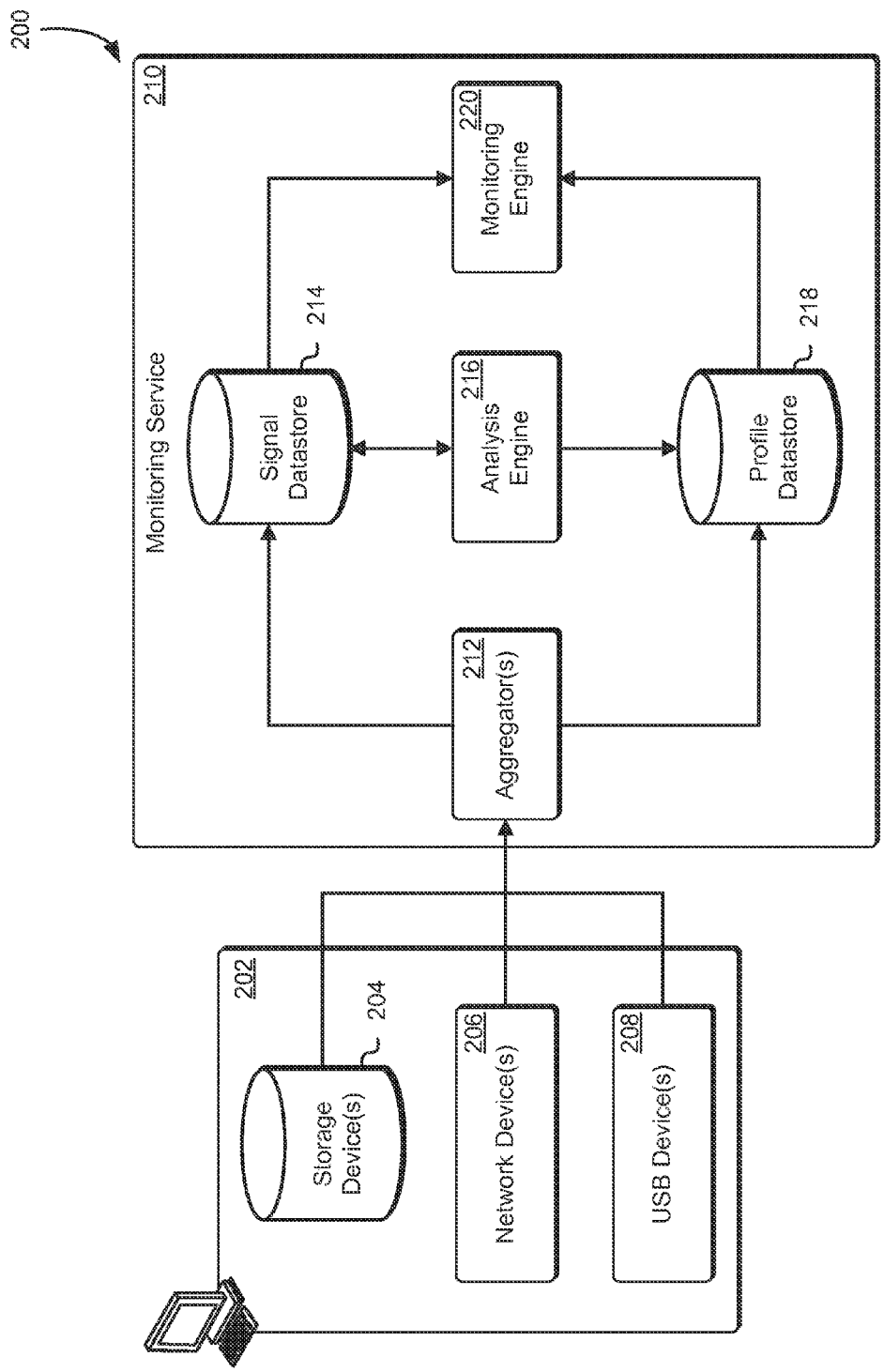
FIG. 2 shows an illustrative example of an environment in which a monitoring service aggregates and processes signals from hardware components of a computer system to obtain beat frequencies for the components and detect anomalies in accordance with at least one embodiment.

As noted above, a computer system may include one or more hardware components which may generate one or more signals through operation of these components. These one or more signals may be transmitted to a monitoring service, which may derive beat frequencies from these one or more signals to determine whether there are any indications of anomalous behavior in the operation of the computer system. Additionally, the monitoring service may maintain a profile for the computer system in order to provide reference information that may be used to identify potentially anomalous behavior. Accordingly, FIG. 2 shows an illustrative example of an environment 200 in which a monitoring service 210 aggregates and processes signals from hardware components of a computer system 202 to obtain beat frequencies for the components and detect anomalies in accordance with at least one embodiment.

In the environment 200, one or more hardware components of a computer system 202 may transmit one or more signals to the monitoring service 210. For instance, in this illustrative example, the computer system 202 may include one or more data storage devices 202 (e.g., hard drives, solid-state drives, etc.), one or more network devices 206 (e.g., wireless adapters, network modems, routers, etc.), and one or more USB devices 208, although the computer device 202 may, in some embodiments, include additional or alternative devices based at least in part on the configuration of the computer system 202. Further, the hardware components selected for analysis may be determined by an administrator/owner of the computer system 202 or the monitoring service 210 itself, based at least in part on interactions between these components and other services associated with the monitoring service 210.

In an embodiment, the hardware components of the computer system 202 (e.g., storage devices 204, network devices 206, USB devices 208, etc.) generate signals over time, which are transmitted to the monitoring service 210 for analysis. These signals comprise binary indicators of operations performed by these hardware components. For instance, when a storage device 204 performs a read/write operation, the storage device 204 may generate a signal over time indicating this period of activity. Thus, the signal generated by each hardware component may demonstrate activity performed by the hardware component over time, as well as idle periods between moments of activity. Each hardware component may transmit these generated signals to an aggregator 212 of the monitoring service 210 for analysis. The aggregator 212 may include one or more computer system modules configured to aggregate signals obtained from a variety of sources for storage within a signal datastore 214. The aggregator 212 may aggregate the various signals from each of the hardware components of the computer system 202 in order to categorize the signals based at least in part on the originating hardware component and on the originating computer system 202. For instance, the aggregator 212 may access a profile datastore 218 to determine whether these hardware components and the computer system have been assigned a corresponding identifier. The aggregator 212 may thus assign an identifier to each hardware component and the computer system 202 and aggregate the signals based at least in part on these identifiers.

Once the aggregator 212 has aggregated and categorized the obtained signals from the one or more hardware components of the computer system 202, the aggregator 212 may store these signals within a signal datastore 214 for further processing. The monitoring service 210 may include an analysis engine 216, which may include one or more computer system modules configured to convert the obtained signals from the signal datastore 214 into frequencies that may be utilized to identify potentially anomalous behavior. For instance, the analysis engine 216 may access the signal datastore 214 to obtain aggregated signals for a hardware component of the computer system 202. Once the analysis engine 216 has obtained aggregated signals from the signal datastore 214, the analysis engine 216 may conduct Fourier analysis on the aggregated signals to generate a set of frequencies for each hardware component of the computer system 202. For example, the analysis engine 216 may utilize the discrete Fourier transform to convert the aggregated signals from a time domain (e.g., a particular time window or range) to a frequency domain. The analysis engine 216 may utilize a fast Fourier transform algorithm to determine the discrete Fourier transform of the aggregated signals and their inverse.

The analysis engine 216 may determine an average frequency for each hardware component of the computer system 202 based at least in part on the frequencies identified through the Fourier analysis. For instance, the analysis engine 216 may identify the peak frequencies for the particular hardware component and calculate a mean frequency based at least in part on these peak frequency values. Alternatively, the analysis engine 216 may evaluate these peak frequencies over a period of time to identify the most stable (e.g., consistent over time) peak frequency for the hardware component, such as described above. Once the analysis engine 216 has identified this peak frequency, the analysis engine 216 may calculate the full width at half maximum value for this peak frequency and utilize this value as the average frequency for the hardware component. The analysis engine 216 may instead utilize the identified peak frequency value for calculation of the beat frequencies.

Once the analysis engine 216 has determined the average frequencies for the various hardware components of the computer system 202, the analysis engine 216 may determine the beat frequency for pairs of hardware components of the computer system 202. The analysis engine 216 may utilize the following equation to calculate the beat frequency of a pair of hardware components of the computer system 202, using the average frequencies:

$$b=|f_1-f_2| \qquad (\text{Eq. 1})$$

where b is the beat frequency, $f_1$ is the average frequency for a first hardware component of the pair and $f_2$ is the average frequency for the second hardware component of the pair. For instance, if the monitoring service 210 has obtained signals for three separate hardware components, the analysis engine 216 may calculate three (e.g., 3 choose 2) beat frequencies for the possible pairs of hardware components of the computer system 202. Thus, the analysis engine 216 may calculate (n choose 2) distinct beat frequencies for n hardware components being analyzed for a computer system 202.

The analysis engine 216 may transmit the calculated beat frequencies to the signal datastore 214 for storage. Additionally, the analysis engine 216 may transmit these beat frequencies to the profile datastore 218, where these beat frequencies may be used to supplement existing reference beat frequencies for the hardware components of the computer system 202. This may enable the profile datastore 218 to generate statistical data for the computer system 202 signals, which may be used to determine whether the calculated beat frequencies indicate potential anomalous behavior. For instance, the profile datastore 218 may calculate, based at least in part on the beat frequencies stored within the profile for the computer system 202, standard deviations for beat frequencies of each pair of hardware components, a mean beat frequency for these beat frequencies, variances for these beat frequencies and the like. Further, as beat frequencies are obtained over time, the profile datastore 218 may identify any patterns to determine whether the beat frequencies are deterministic (e.g., the beat frequencies are steady over time, scale linearly with an increase in a frequency for a particular hardware component, etc.) or are non-deterministic (e.g., erratic over time). This information may be included within the computer system 202 profile for further analysis.

The monitoring service 210 may further include a monitoring engine 220, which may comprise one or more computer system modules configured to detect possible anomalies based at least in part on comparisons between obtained beat frequencies for hardware components of the computer system 202 and reference beat frequencies from the profile for the computer system 202. The monitoring engine 220 may obtain from the signal datastore 214 the current set of beat frequencies for the signals obtained from the computer system. Additionally, the monitoring engine 220 may obtain the reference beat frequencies from the profile in the profile datastore 218, as well as other information that may be useful in determining whether there are one or more potential anomalies in the operation of the computer system 202. For instance, the monitoring engine 220 may obtain the statistical data for the reference beat frequencies, the pattern information for the reference beat frequencies, and the like.

Once the monitoring engine 220 obtains the beat frequencies from the signal datastore 214, the monitoring engine 220 may compare these beat frequencies against the reference beat frequencies to determine whether there are any differences between these beat frequencies for individual pairs of hardware components of the computer system 202. Based at least in part on these differences, the monitoring engine 220 may utilize the statistical data from the profile for the computer system 202 to determine whether any of these differences exceed the standard deviation for the reference beat frequencies. If so, this may serve as an indication that there is a potential anomaly in the operation of the computer system 202. Additionally, or alternatively, the monitoring engine 220 may utilize the current beat frequencies being analyzed to identify any patterns for the operation of the computer system 202. The monitoring engine 220 may utilize one or more pattern matching techniques to compare these identified patterns to known patterns for the reference beat frequencies of the computer system 202. If there is a deviation from these known patterns, it may serve as an additional indicator that there is a potential anomaly in the operation of the computer system 202.

If the monitoring engine 220 determines that there is a potential anomaly in the operation of the computer system 202, the monitoring engine 220 may generate one or more alerts or other notifications that may indicate that the performed comparison of the beat frequencies indicates one or more anomalies in the operation of the computer system 202. The monitoring service 220 may transmit these alerts to the computer system 202 to enable the computer system 202 to perform one or more remedial actions to prevent further anomalous behavior. Additionally, the monitoring engine 220 may transmit these alerts to an administrator/owner of the computer system 202. This may enable the administrator/owner to perform additional tests on the computer 202 to determine the cause of the anomalous behavior and perform corrective actions. Alternatively, the monitoring engine 220 may transmit the alerts to a security service (not shown), which may quarantine the computer system 202 and prevent any interaction of services and resources associated with the monitoring service 210 with the computer system 202. The security service may perform various simulations through the computer system 202 to identify the cause of the anomalous behavior.

In an embodiment, if the monitoring engine 220 determines that the current set of beat frequencies do not demonstrate anomalous behavior in the operation of the computer system 202, the monitoring engine 220 will update the profile for the computer system 202 to incorporate this current set of beat frequencies. For instance, the monitoring engine 220 may update the statistical data for the computer system 202 by recalculating this statistical data using the current set of beat frequencies as additional input. Further, the monitoring engine 220 may utilize the current set of beat frequencies to update any patterns for the computer system 202 profile. This may help improve the accuracy of the information in the profile and the detection of potential anomalies in the operation of the computer system.

Figure 3:
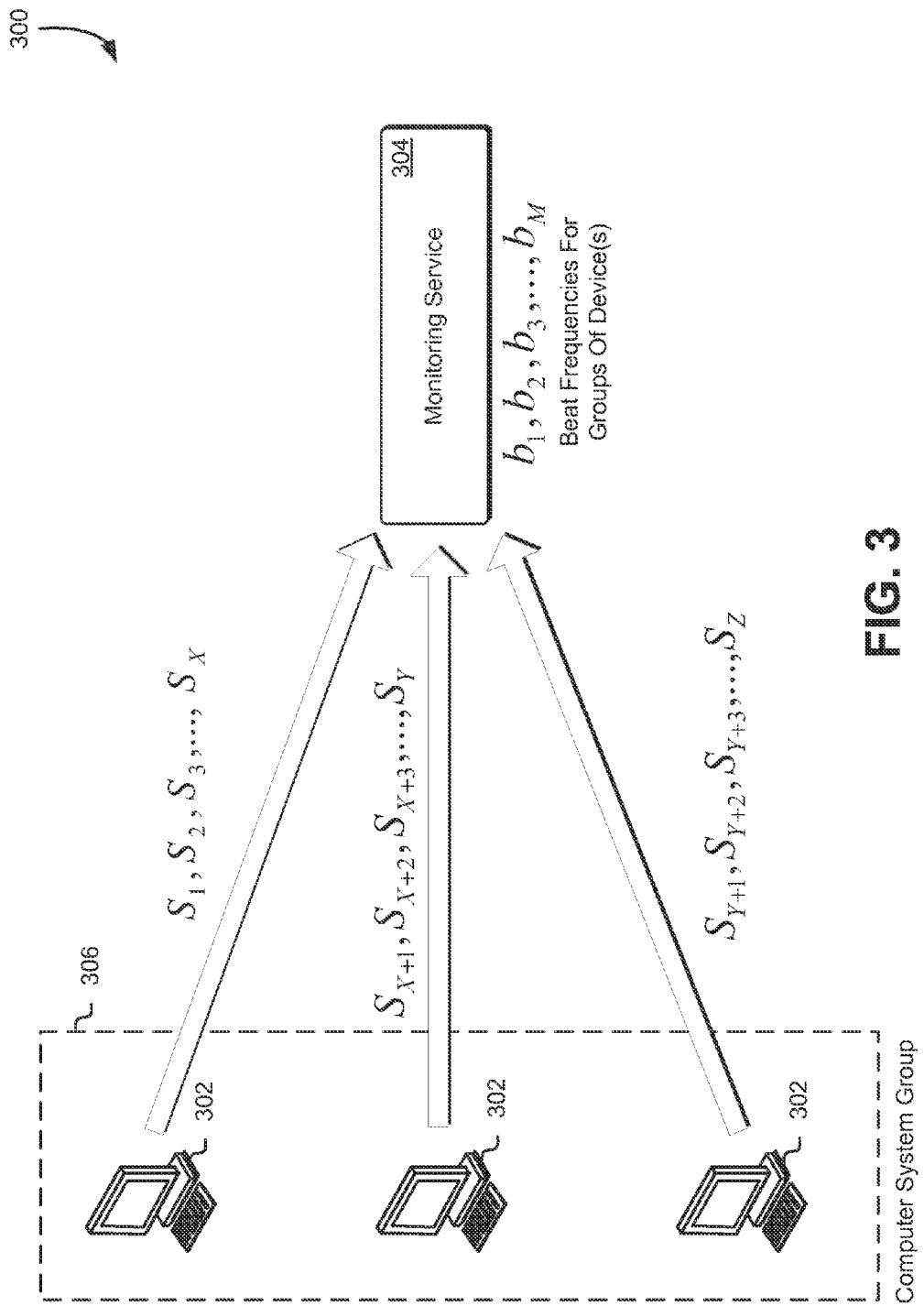
FIG. 3 shows an illustrative example of an environment in which a monitoring service aggregates and processes signals for a computer system group to obtain beat frequencies for the group and to detect anomalies for the group in accordance with at least one embodiment.

In various embodiments, the monitoring service can generate profiles for groups of computer systems or groupings of hardware components of various computer systems that may interact with one another. The monitoring service may obtain the beat frequencies for the hardware components of the group in order to determine potential anomalous behavior for the group. Accordingly, FIG. 3 shows an illustrative example of an environment 300 in which a monitoring service 304 aggregates and processes signals for a computer system group 306 to obtain beat frequencies for the group and to detect anomalies for the group in accordance with at least one embodiment.

In the environment 300, one or more computer systems 302 of a computer system group 306 may transmit one or more signals to the monitoring service 304 for anomaly detection and analysis. As noted above, each computer system 302 of the computer system group 306 may include one or more hardware components that may generate binary signals based at least in part on the operation of the one or more hardware components over time. Each of these hardware components may transmit their own signals to the monitoring service 304 for analysis. The computer system group 306 may be identified by a customer of the monitoring service 304, which may transmit a request to the monitoring service 304 to create a profile for the computer system group 306 and specify the computer systems 302 that are a part of the group 306. Alternatively, the monitoring service 304 may generate a profile for the computer system group 306 based at least in part on a mapping of relationships among various computer systems 302 in a distributed computing environment.

Each computer system of the computer system group may transmit signals for their corresponding hardware components to the monitoring service 304 for analysis and anomaly detection. The monitoring service 304 may aggregate the various signals from the computer systems 302 of the computer system group 306 and associate each set of signals with an identifier for the group 306 and an identifier for the particular hardware component that generated the signal. Subsequently, the monitoring service 304 may perform a Fourier analysis (e.g., discrete Fourier transform, fast Fourier transform, etc.) to obtain a set of frequencies for each signal obtained from the computer systems 302 of the group 306. Through an analysis engine, the monitoring service 304 may calculate, for each set of frequencies, an average frequency for each hardware component of the computer systems 302 within the computer system group 306.

Once the monitoring service 304 has determined the average frequencies for each of the hardware components of the computer systems 302, the monitoring service 304 may calculate beat frequencies for each pairing of hardware components for the computer system group 306. For instance, if the computer system group 306 includes n hardware components, the monitoring service 304 may calculate (n choose 2) beat frequencies for the computer system group 306. Alternatively, if specific hardware components are related other hardware components of the group 306, the monitoring service 304 may calculate beat frequencies for pairings of interrelated hardware components of the group 306. The number of beat frequencies as a result may be fewer than (n choose 2) for n number of hardware components.

The monitoring service 304 may utilize the obtained set of beat frequencies for the hardware component pairings to determine whether this set of beat frequencies are indicative of anomalous behavior associated with the computer system group 306. For instance, the monitoring service 304 may obtain a set of reference beat frequencies for the computer system group 306 and compare this set of reference beat frequencies to the current set of beat frequencies to identify any indications of anomalous behavior. The monitoring service 304 may utilize statistical data from the profile and for the reference beat frequencies to determine whether the any beat frequencies of the current set of beat frequencies exceed a computed standard deviation for the reference beat frequencies. Alternatively, the monitoring service 304 may maintain a threshold for acceptable difference between individual reference beat frequencies and the corresponding beat frequencies calculated using the current set of signals from the computer system group 306.

In an embodiment, the monitoring service 304 identifies, for the reference beat frequencies of the computer system group 306, one or more patterns for the beat frequencies over time. The monitoring service 304 may utilize these one or more patterns to determine whether the current set of beat frequencies present an aberration to these one or more patterns. If so, this may be indicative of anomalous behavior associated with operation of the one or more computer systems 302 of the computer system group 306.

If the monitoring service 304 determines that the result of the comparison between the reference beat frequencies and the current set of beat frequencies is an indication of potential anomalous behavior associated with one or more computer systems 302 of the group 306, the monitoring service 304 may generate one or more alerts. These alerts may include information, which may specify that the performed comparison indicates one or more anomalies in operation of the computer systems 302 of the computer system group 306. The monitoring service 304 may transmit these alerts to an administrator/owner of the group 306, the particular computer systems 302 associated with the anomalous behavior, or to a security service to perform remedial actions to address this anomalous behavior.

As noted above, the monitoring service may utilize Fourier analysis to convert a binary signal for operations performed by a hardware component of a computer system into a set of frequencies, which may be used to calculate beat frequencies for the computer system.

Figure 4:
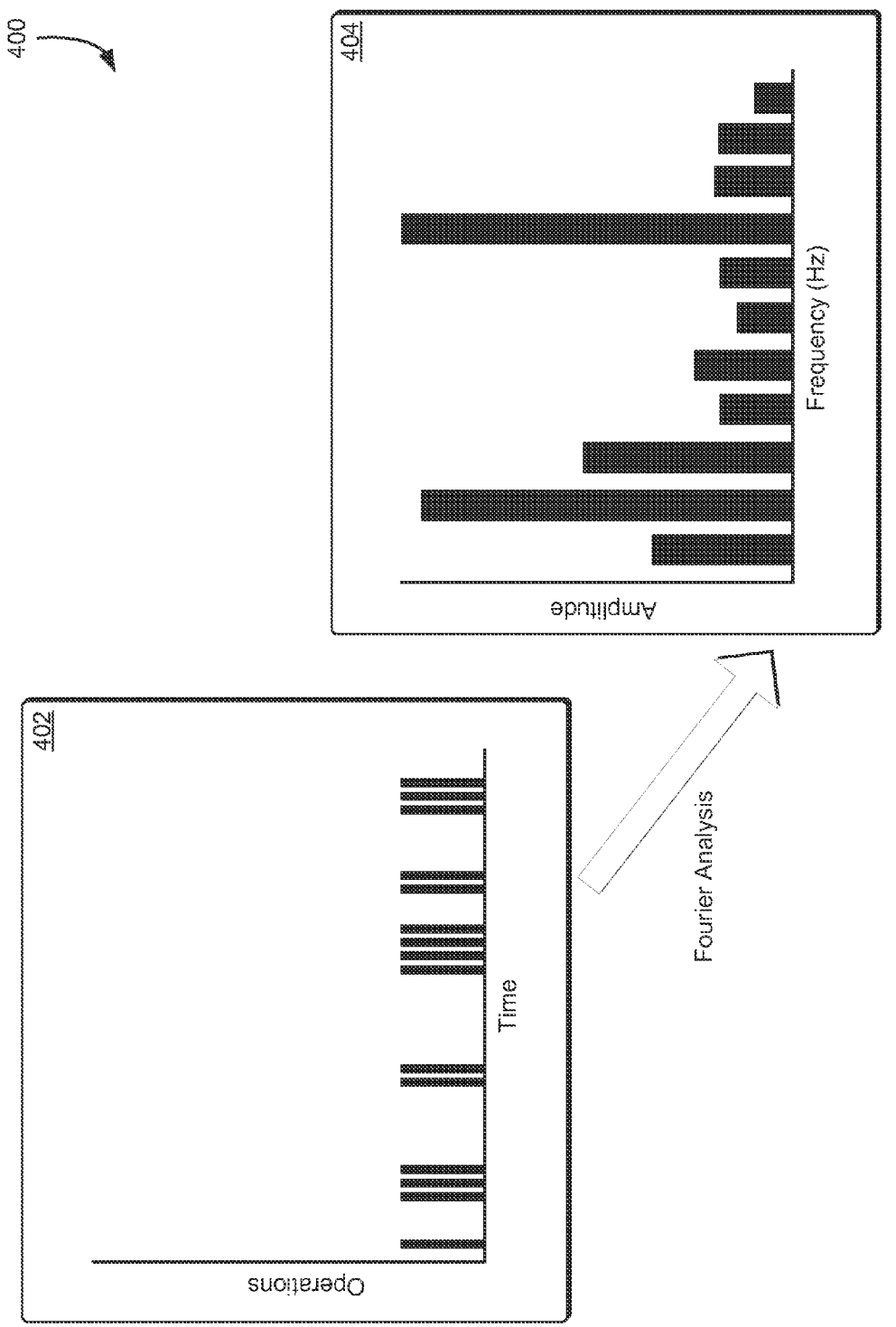
FIG. 4 shows an illustrative example of an environment in which a Fourier transform is utilized to obtain one or more frequencies based at least in part on obtained signal data for a hardware component in accordance with at least one embodiment.

Accordingly, FIG. 4 shows an illustrative example of an environment 400 in which a Fourier transform is utilized to obtain one or more frequencies 404 based at least in part on obtained signal data 402 for a hardware component in accordance with at least one embodiment. In the environment 400, the signal data 402 obtained from a hardware component of a computer system may include binary data indicative of operations performed by the hardware component over time. For instance, the hardware component of the computer system may record an operation as a binary point in the signal data 402 for a particular time segment. These binary points 402, when combined over time, may result in a signal that may be analyzed for the hardware component.

When the monitoring service obtains the signal data 402 from the hardware component of the computer system or from the computer system itself, the monitoring service may perform one or more Fourier analyses to convert the binary signal data 402 into a set of frequencies 404. For instance, the monitoring service may use the discrete Fourier transform to convert the signal data 402 into a set of frequencies 404. Alternatively, the monitoring service may utilize one or more fast Fourier transform algorithms to obtain the set of frequencies 404. The set of frequencies 404 may highlight one or more peak frequencies, which may be used to calculate an average frequency for the signal obtained from the hardware component. For instance, the monitoring service may identify the peak frequencies from the set of frequencies 404 and utilize these peak frequency values to calculate a mean frequency for the hardware component. Alternatively, the monitoring service may evaluate the set of frequencies 404 over a period of time to identify a stable peak frequency that may be used to calculate the average frequency for use in calculating the various beat frequencies for the computer system. For instance, as illustrated in FIG. 4, the set of frequencies 404 include two peak frequencies. Of these two peak frequencies, one of these peak frequencies may be stable over time while the other peak frequency oscillates or is non-deterministic over time. The monitoring service may utilize this stable peak frequency as the average frequency for the hardware component. Alternatively, the monitoring service may calculate the full width at half maximum value for this peak frequency and utilize this value for the beat frequency calculations.

Figure 5:
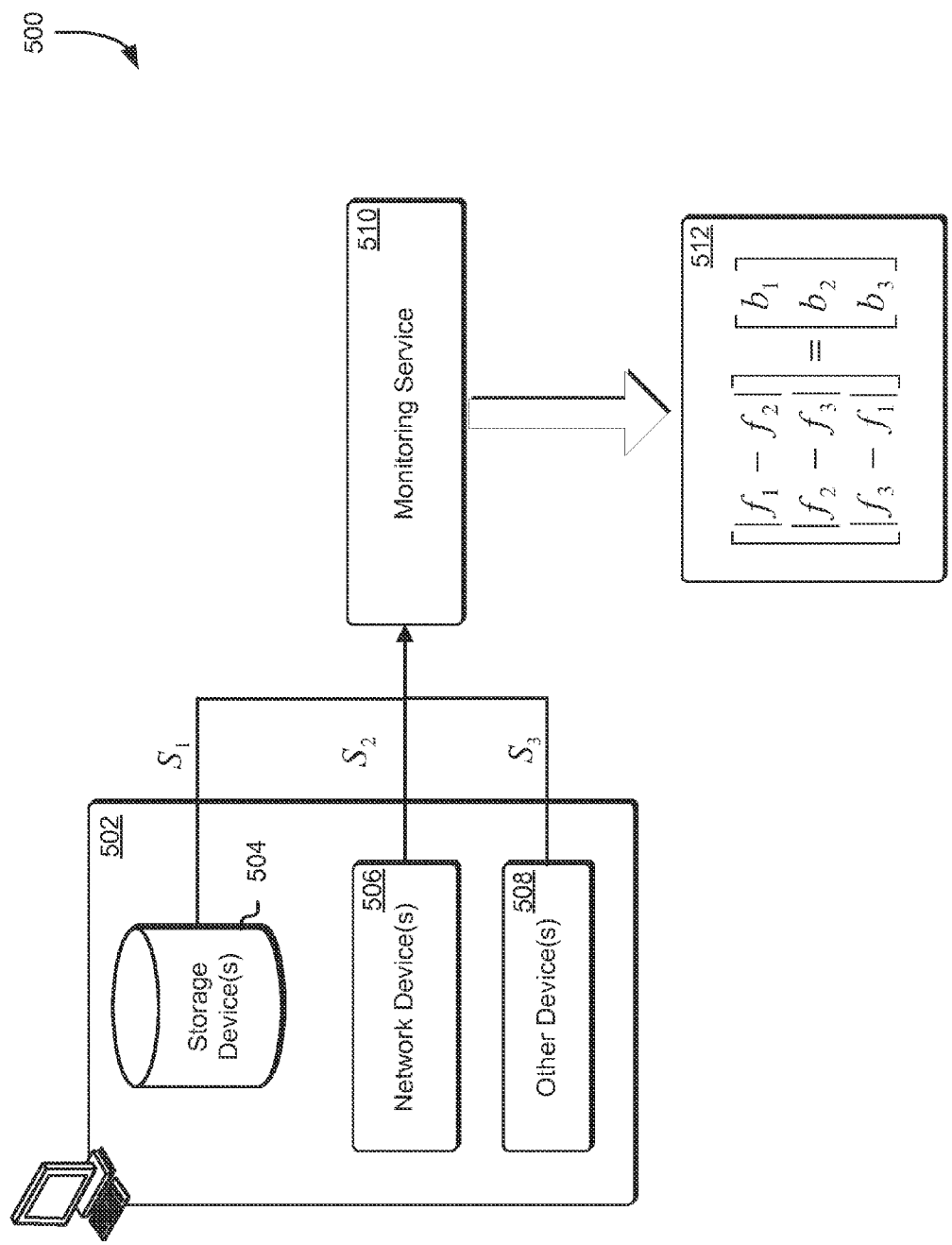
FIG. 5 shows an illustrative example of an environment in which signals resulting from one or more hardware components of a computer system are used to generate beat frequencies for the computer system in accordance with at least one embodiment.

As noted above, the monitoring service may utilize signals obtained from one or more hardware components of a computer system to generate a number of beat frequencies for pairings of these hardware components. The monitoring service may calculate average frequencies, as described above in connection with FIG. 4, and utilize these average frequencies to calculate these beat frequencies. Accordingly, FIG. 5 shows an illustrative example of an environment 500 in which signals resulting from one or more hardware components 504, 506, 508 of a computer system 502 are used to generate beat frequencies for the computer system 502 in accordance with at least one embodiment.

In an embodiment, each hardware component of a computer system 502 generates one or more binary signals based at least in part on operations performed by the hardware component. For instance, as illustrated in FIG. 5, a storage device 504 may generate a first signal ($S_1$), a network device 506 may generate a second signal ($S_2$), and another device 508 may generate a third signal ($S_3$). The monitoring service 510 may perform one or more Fourier analyses of these signals to obtain a set of frequencies for each hardware component 504, 506, 508 of the computer system 502. Additionally, the monitoring service 510 determine, for each signal, an average frequency that may be used to calculate beat frequencies 512 for each pairing of hardware components 504, 506, 508. For instance, using Eq. 1 described above, the monitoring service 510 may calculate (n choose 2) beat frequencies for the hardware components. In this illustrative example, since the computer system 502 includes at least three hardware components, the monitoring service may calculate three distinct beat frequencies 512 for the pairings of hardware components for the computer system 502. The monitoring service 510 may utilize these beat frequencies 512 to update the profile for the computer system 502 and to determine whether these beat frequencies 512 are indicative of one or more anomalies associated with operation of the computer system 502.

Figure 6:
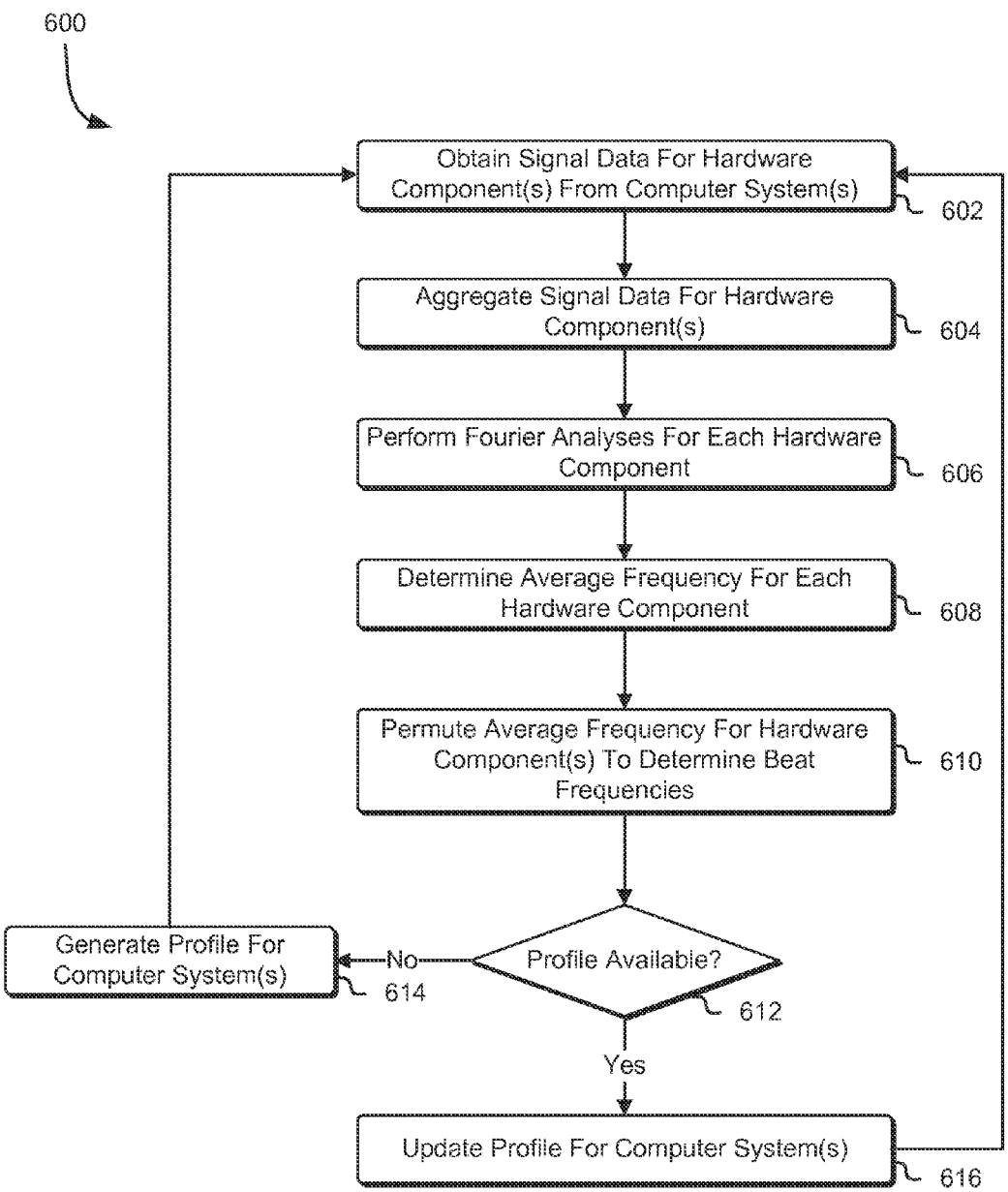
FIG. 6 shows an illustrative example of a process for generating beat frequencies based at least in part on obtained signals from one or more computer systems and utilizing these beat frequencies to create a profile for the one or more computer systems in accordance with at least one embodiment.

As noted above, a monitoring service may obtain signal data from one or more hardware components of a computer system or group of computer systems, which may be used to calculate a set of frequencies for each hardware component. These frequencies may be used to generate a set of beat frequencies for the computer system, which may be used to populate or update a profile for the computer system. The profile may be used to determine, at a later time, whether a set of beat frequencies for the computer system are indicative of one or more anomalies associated with operation of the computer system. Accordingly, FIG. 6 shows an illustrative example of a process 600 for generating beat frequencies based at least in part on obtained signals from one or more computer systems and utilizing these beat frequencies to create a profile for the one or more computer systems in accordance with at least one embodiment. The process 600 may be performed by the aforementioned monitoring service, which may be configured to obtain signals from various computer systems and hardware components of these computer systems to determine beat frequencies for pairings of hardware components and maintain a profile for the computer system based at least in part on these beat frequencies.

At any time, or at certain time intervals, the monitoring service may obtain 602 signal data for one or more hardware components from one or more computer systems or from the hardware components. Alternatively, the monitoring service may obtain 602 the signal data for the one or more hardware components from a data store that includes this signal data from the one or more hardware components over time. In some instances, the monitoring service may obtain signal information, which may include the raw signal data, filtered signal data (e.g., noise reduction, etc.), distilled signal data, and the like. The signal data may be generated in binary format, whereby each signal data point may correspond to an operation performed by the hardware component. For instance, if the hardware component is performing an operation, the signal data may illustrate that this operation occurred by using a value of one for the period of operation. Alternatively, if the hardware component is idle, the signal data may illustrate this with a value of zero for the idle period.

Once the monitoring service has obtained the signal data for the various hardware components of the computer system of group of computer systems, the monitoring service, through an aggregator, may aggregate 604 the signal data for each hardware component. For instance, the monitoring service may assign an identifier to each hardware component and to the computer system or group of computer systems itself. These identifiers may be used to organize the various signals in a manner that enables analysis of signal data for a hardware component over time. From this aggregated signal data, the monitoring service may divide this data based at least in part on time periods for analysis. For instance, the monitoring service may evaluate signal data for minute intervals, hourly intervals, daily intervals, and the like.

The monitoring service may utilize the aggregated signal data for each hardware component to perform 606 one or more Fourier analyses of this signal data. To perform these one or more Fourier analyses, the monitoring service may use the discrete Fourier transform to convert the signal data for a hardware component into a series of frequencies. This series of frequencies may illustrate peak frequencies for the signal, which may be used to determine 608 an average frequency for the hardware component. For instance, the monitoring service may identify the peak frequencies for the signal and obtain the mean of these peak frequencies to calculate the average frequency. Alternatively, if the monitoring service has identified a number of peak frequencies for the hardware component, the monitoring service may evaluate these peak frequencies over time to determine which peak frequencies are stable over time. Once the monitoring service has identified these one or more stable peak frequencies, the monitoring service may obtain the mean value for these peak frequencies, which may be used at the average frequency for this hardware component. If the monitoring service identifies a singular stable peak frequency for the hardware component, the monitoring service may calculate the full width at half maximum value for this peak frequency. This value may then be used as the average frequency for the hardware component. While the discrete Fourier transform is used extensively for the purpose of illustration, other Fourier methods may be used to obtain the set of frequencies, including fast Fourier transform algorithms, the discrete time Fourier transform, and the like.

Once the monitoring service has obtained the average frequency for each hardware component, the monitoring service may permute 610 these average frequencies to determine a beat frequency for each pairing of hardware components of the computer system or group of computer systems. For instance, if the monitoring service has obtained, for a particular computer system or group of computer systems, signals for an n number of hardware components, the monitoring service may calculate (n choose 2) beat frequencies based at least in part on (n choose 2) possible pairings of hardware components of the computer system or group of computer systems. Alternatively, if the monitoring service has obtained information usable to determine relationships among the various hardware components of the computer system or group of computer systems, the monitoring service may calculate a number of beat frequencies for pairings of the hardware components that are related to one another. This may result in fewer than (n choose 2) beat frequencies for the computer system or group of computer systems.

The monitoring service may determine 612 whether there is an existing profile available for the computer system or group of computer systems. For instance, the monitoring service may have previously created a profile for the computer system or group of computer systems based at least in part on signal data previously obtained from the hardware components of the computer system or group of computer systems. The profile may include previously calculated beat frequencies for the hardware component pairings, as well as statistical data and pattern information for the beat frequencies over time. For instance, the profile may specify one or more standard deviation values for the beat frequencies within the profile, which may be used to determine whether there is an indication of one or more anomalies associated with operation of the computer system or group of computer systems. Similarly, the monitoring service may calculate variances for the beat frequencies, mean values for the beat frequencies, and the like. The monitoring service may further utilize the beat frequencies to identify any patterns of behavior for the computer system or group of computer systems. For instance, if a pair of signals is correlated, the beat frequency may remain static, or scale linearly with an increase in either frequency. If they are not correlated, the beat frequency may be non-deterministic. Deviations from this behavior may also serve as an indication of one or more anomalies.

If a profile is not available for the computer system or group of computer systems, the monitoring service may generate 614 a profile for the computer system or group of computer systems. Additionally, as described above, the monitoring service may utilize the obtained beat frequencies to calculate various statistical data that may be used to detect potential anomalous behavior for future hardware component signals. The monitoring service may further use the obtained beat frequencies to identify any patterns of behavior for these hardware components that may be used to identify anomalous behavior associated with operation of the computer system or group of computer systems. Once the monitoring service has created a new profile, the monitoring service may obtain 602 new signal data from these hardware components to identify potential anomalies.

Alternatively, if there is a profile available for the computer system or group of computer systems, the monitoring service may update 616 the profile for the computer system or group of computer systems. For instance, the monitoring service may utilize the newly obtained beat frequencies for the one or more hardware component pairings to update the statistical data included within the profile. This may provide greater convergence to a statistical solution to the determination of the standard deviation for the beat frequencies, variances for the beat frequencies, mean values for the beat frequencies, and the like. Further, the newly obtained beat frequencies may be utilized to update the patterns previously identified for the hardware component pairings and the computer system or group of computer systems themselves. This updated profile may then be used to evaluate future data signals from hardware components of the computer system or group of computer systems. Again, once the monitoring service has updated the profile, the monitoring service may obtain 602 new signal data from these hardware components to identify potential anomalies.

Figure 7:
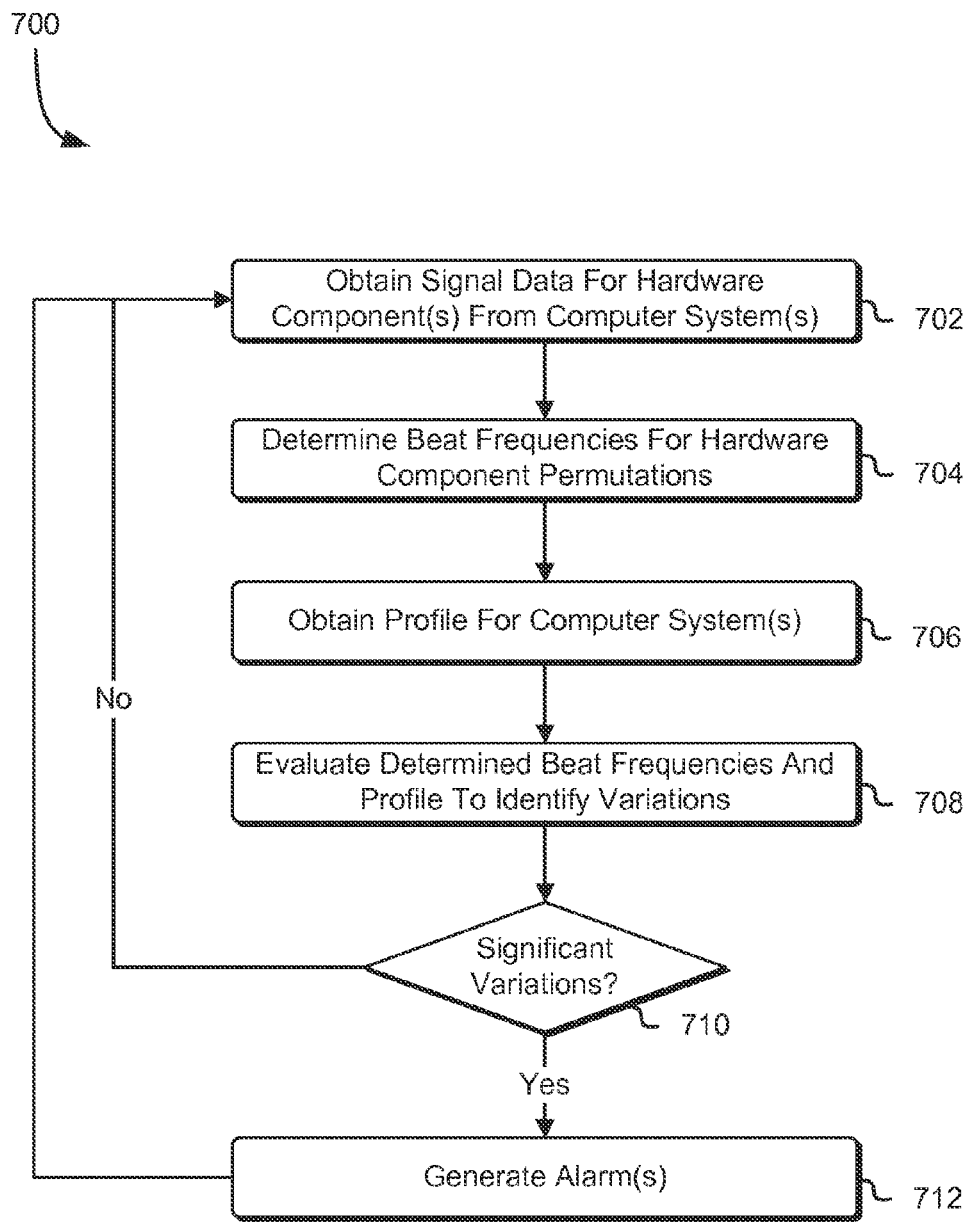
FIG. 7 shows an illustrative example of a process for utilizing beat frequencies based at least in part on obtained signals from one or more computer systems to identify any anomalies with operation of the one or more computer systems in accordance with at least one embodiment.

As noted above, the monitoring service may evaluate beat frequencies for pairings of hardware components to identify any anomalies associated with operation of a computer system or group of computer systems. The monitoring service may utilize the beat frequencies included in the profile of the computer system or group of computer systems, as well as any statistical data and/or identified patterns, to determine whether the newly obtained beat frequencies are indicative of one or more anomalies associated with operation of the computer system or group of computer systems. Accordingly, FIG. 7 shows an illustrative example of a process 700 for utilizing beat frequencies based at least in part on obtained signals from one or more computer systems to identify any anomalies with operation of the one or more computer systems in accordance with at least one embodiment. The process 700 may be performed by the aforementioned monitoring service, which may obtain signal data from hardware components of a computer system or of computer systems of a group of computer systems. The monitoring service may also maintain a profile for each computer system or group of computer systems, which may include previously calculated beat frequencies, statistical data determined based at least in part on these previously calculated beat frequencies, and any identified patterns associated with these beat frequencies.

Similar to the process 600 described above in connection with FIG. 6, the monitoring service may obtain 702 signal data for one or more hardware components of a computer system or group of computer systems. The signal data may be generated in binary format, whereby each signal data point may correspond to an operation performed by the hardware component. For instance, if the hardware component is performing an operation, the signal data may illustrate that this operation occurred by using a value of one for the period of operation. Alternatively, if the hardware component is idle, the signal data may illustrate this with a value of zero for the idle period. The signal data may be collected over a particular period of time. For instance, the hardware components may record this signal data for a period of time before making the signal data available for delivery to the monitoring service.

Once the monitoring service has obtained the signal data for the one or more hardware components of the computer system or group of computer systems, the monitoring service may determine 704 a set of beat frequencies for hardware component permutations. The monitoring service may utilize one or more Fourier analyses to convert the received signal data into a set of frequencies for a particular time window. Using this set of frequencies, the monitoring service may calculate an average frequency for each hardware component through use of peak frequencies as described above. The monitoring service may utilize these average frequencies for the one or more hardware components to generate beat frequencies for each pairing of hardware components of the computer system or group of computer systems. This may result in, at most, (n choose 2) beat frequencies, where n is the number of hardware components of the computer system or group of computer systems.

The monitoring service may subsequently obtain 706, from a profile datastore, a profile for the computer system or group of computer systems. This profile may specify previously calculated beat frequencies for the hardware component pairings of the computer system or group of computer systems. Additionally, the profile may specify statistical data calculated using the previously obtained beat frequencies over time. For instance, the profile may specify one or more standard deviation values, variance values, and mean values for the collective beat frequencies and for individual beat frequencies for pairings of hardware components. Further, the profile may specify pattern information generated based at least in part on patterns identified through evaluation of previously obtained beat frequencies. For instance, if a pair of signals is correlated, the beat frequencies may remain static, or scale linearly with an increase in either frequency. If they are not correlated, the beat frequencies may be non-deterministic and erratic.

In an embodiment, the profile for the computer system or group of computer systems can specify a genre to which the computer system or group of computer systems belongs to. A genre, in an embodiment, is a classification of a computer system (which may be a distributed computer system) based at least in part on its use. For example, web servers of an organization providing a frontend for a website may be classified in one genre while a software development engineer may be classified in another genre. Genres may also be sub-genres. For example, different software developer engineers' computer systems may be classified in different sub-genres based at least in part on seniority level due to the different tasks the different engineers perform within an organization. The genre may be utilized to specify a common set of beat frequencies and other statistical data for computer systems that belong to this particular genre. For example, if a computer system is utilized for customer support tasks, the monitoring service may identify common beat frequencies and other statistical data for computer systems used in customer support roles to determine a pattern for these computer systems. The monitoring service, over time, may identify this pattern through evaluation of computer systems used in customer support roles and define the genre for all computer systems in this role. Thus, by specifying that a computer system or group of computer systems belong to a particular genre, the monitoring service may provide known patterns, statistical data, and beat frequencies for the genre. These may be utilized to evaluate any new signals obtained from the computer system or group of computer systems to determine whether these new signals comport with data for the genre.

Once the monitoring service has obtained the profile information for the computer system or group of computer systems, the monitoring service may evaluate 708 the determined beat frequencies against the beat frequencies and other information included within the profile to identify any variations. For instance, the monitoring service may calculate the difference between the recently obtained beat frequency for a pairing of hardware components and the previously obtained beat frequencies for the pairing. Additionally, the monitoring service may utilize the statistical data within the profile to determine whether the beat measurements reside outside of statistical norms for the previously observed beat frequencies. For instance, the monitoring service may determine whether any of these differences are beyond a number of standard deviations from the statistical norm for the previously observed beat frequencies. Further, the monitoring service may determine, based at least in part on these newly obtained beat frequencies, a new set of patterns. The monitoring service may utilize pattern matching to determine whether this newly obtained set of patterns correspond to the previously observed patterns for the computer system or hardware components of the computer system. These evaluations may allow the monitoring service to determine 710 whether there are significant variations between the obtained beat frequencies and the previously observed beat frequencies.

If the monitoring service determines that there are significant variations between the newly obtained beat frequencies and previously observed beat frequencies for the pairings of hardware components of a computer system, the monitoring service may generate 712 one or more alarms or alerts that may specify an indication of one or more anomalies associated with operation of the computer system. The monitoring service may transmit these one or more alarms to the computer system or affected computer systems of the group of computer systems to enable these computer systems to identify the source of the one or more anomalies and perform remedial operations to address these anomalies. Alternatively, the monitoring service may transmit these alarms to an administrator/owner of the computer system or group of computer systems. This may enable the administrator/owner to perform one or more tasks to identify the source of these one or more anomalies.

Alternatively, if the monitoring service determines that the identified variations are not significant, the monitoring service may incorporate these newly obtained beat frequencies into the profile for the computer system or group of computer systems. For instance, the monitoring service may utilize the newly obtained beat frequencies for the one or more hardware component pairings to update the statistical data included within the profile. Further, the newly obtained beat frequencies may be utilized to update the patterns previously identified for the hardware component pairings and the computer system or group of computer systems themselves. This updated profile may then be used to evaluate future data signals from hardware components of the computer system or group of computer systems. Once the monitoring service has updated the profile, the monitoring service may obtain 702 new signal data from these hardware components to identify potential anomalies.

Figure 8:
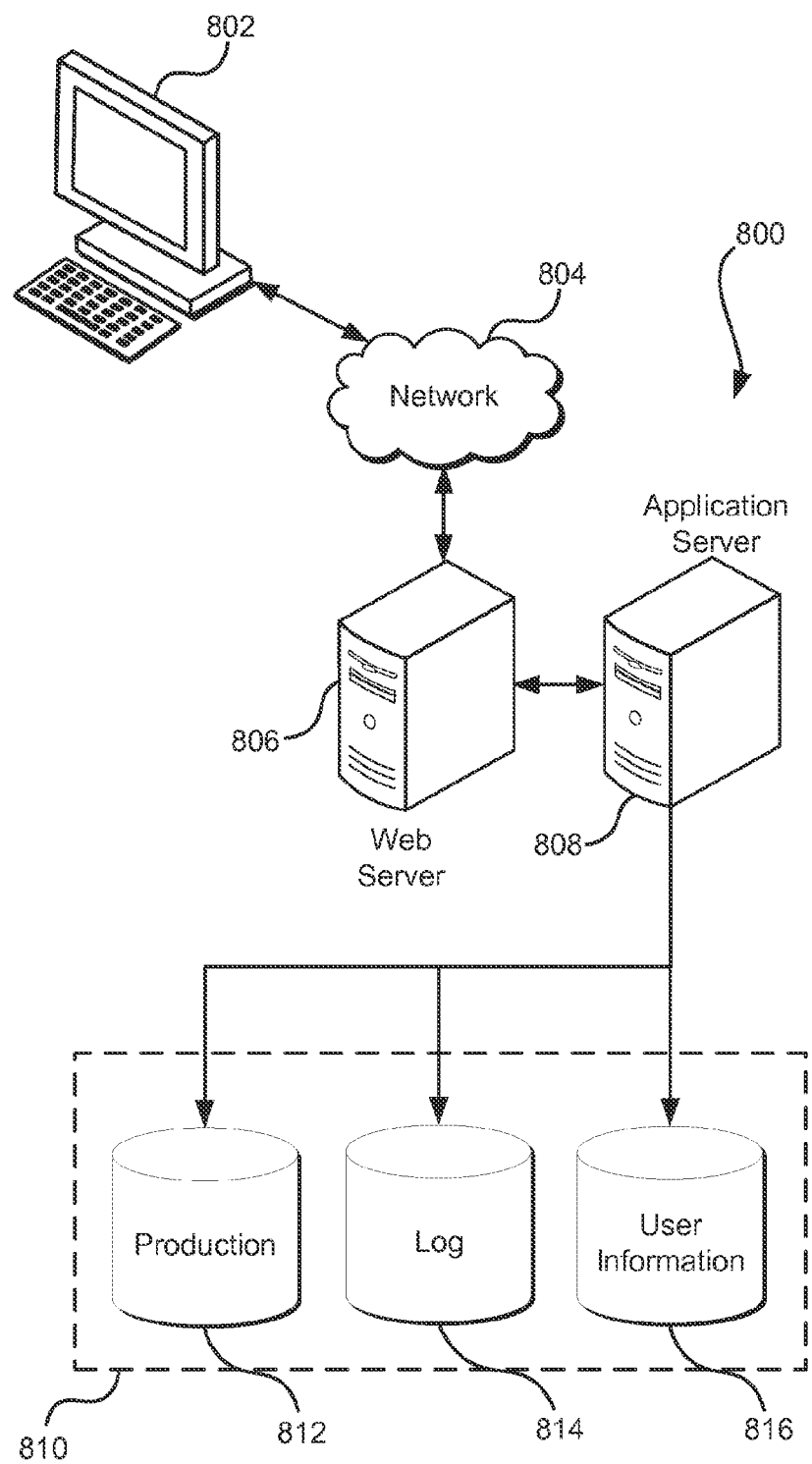
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a plurality of signals resulting from operation of a computer system;
   performing a Fourier transform on individual signals of the plurality of signals to obtain a plurality of frequencies;
   calculating a plurality of beat frequencies for a plurality of pairs of the plurality of frequencies;

obtaining a profile of the computer system, the profile including information usable to determine a plurality of reference beat frequencies associated with the computer system;

performing a comparison of individual calculated beat frequencies with respective reference beat frequencies from the profile; and transmitting a notification that indicates whether the performed comparison indicates one or more anomalies in operation of the computer system.

2. The computer-implemented method of claim 1, wherein the plurality of signals resulting from the operation of the computer system correspond to a plurality of different hardware components of computer system, wherein individual hardware components of the plurality of hardware components cause the individual signals of the plurality of signals.

3. The computer-implemented method of claim 1, further comprising:

calculating, for the individual signals of the plurality of signals, a plurality of peak frequencies based at least in part on the plurality of frequencies obtained from performance of the Fourier transform on the individual signals; and utilizing the plurality of peak frequencies for the individual signals of the plurality of signals to calculate the plurality of beat frequencies.

4. The computer-implemented method of claim 1, further comprising:

obtaining, from the profile, one or more patterns for the plurality of reference beat frequencies;

determining, for the calculated plurality of beat frequencies, one or more other patterns for the computer system; and performing pattern matching of the one or more patterns with the one or more other patterns to identify additional anomalies in operation of the computer system.

5. A system, comprising at least one computing device with a processor, the at least one computing device configured to implement one or more services, wherein the one or more services are configured to:

access signal information generated based at least in part on a plurality of signals resulting from a set of computer systems;

determine, based at least in part on the accessed signal information, a set of beat frequencies; and determine, based at least in part on the determined set of beat frequencies, information categorizing operation of at least one of the set of computer systems.

6. The system of claim 5, wherein the one or more services are further configured to:

perform a Fourier transform on the signal information to obtain a set of frequencies; and utilize the set of frequencies to determine the set of beat frequencies.

7. The system of claim 5, wherein the one or more services are further configured to:

obtain, from a profile of the set of computer systems, a plurality of reference beat frequencies associated with the set of computer systems; and perform a comparison of individual beat frequencies of the set of beat frequencies with the plurality of reference beat frequencies to determine the information categorizing the operation of the set of computer systems.

8. The system of claim 7, wherein the one or more services are further configured to:

obtain, from the profile of the set of computer systems, information specifying one or more patterns associated with the plurality of reference beat frequencies;

identify, for the set of beat frequencies, one or more other patterns associated with the set of beat frequencies; and generate additional information categorizing the operation of the set of computer systems based at least in part on an analysis of the one or more patterns and the one or more other patterns.

9. The system of claim 7, wherein:

the profile of the set of computer systems includes statistical data for the plurality of reference beat frequencies; and the one or more services are further configured to analyze the set of beat frequencies using the statistical data to generate the additional information.

10. The system of claim 5, wherein the one or more services are further configured to:

determine, for individual signals of the received plurality of signals, a set of characteristic frequencies; and utilize the set of characteristic frequencies to determine the set of beat frequencies.

11. The system of claim 5, wherein the determined information specifies whether one or more anomalies have been identified based at least in part on the set of beat frequencies.

12. The system of claim 5, wherein the plurality of signals resulting from the set of computer systems correspond to a plurality of different hardware components of the set of computer systems, wherein individual hardware components of the plurality of hardware components generate individual signals of the plurality of signals.

13. A non-transitory computer-readable storage medium having stored thereon executable instructions that, when executed by one or more processors of a computer system, cause the computer system to at least:

obtain signal information based at least in part on a plurality of signals resulting from a set of computer systems;

determine, based at least in part on the obtained plurality of signal information, a set of beat frequencies; and identify, based at least in part on the determined set of beat frequencies, any anomalies in operation of the set of computer systems.

14. The non-transitory computer-readable storage medium of claim 13, wherein the instructions further cause the computer system to generate one or more alerts specifying indication of one or more anomalies in operation of the set of computer systems as a result of having identified the one or more anomalies.

15. The non-transitory computer-readable storage medium of claim 13, wherein the instructions further cause the computer system to:

perform one or more Fourier analyses the signal information to obtain a set of frequencies;

calculate, based at least in part on the obtained set of frequencies, a set of average frequencies for the plurality of signals; and utilize the set of average frequencies to determine the set of beat frequencies.

16. The non-transitory computer-readable storage medium of claim 13, wherein the instructions further cause the computer system to:

obtain, from a profile of the set of computer systems, a plurality of reference beat frequencies associated with the set of computer systems; and compare the set of beat frequencies with the plurality of reference beat frequencies to identify any anomalies in operation of the set of computer systems.

17. The non-transitory computer-readable storage medium of claim 16, wherein the instructions further cause the computer system to:
- obtain, from the profile of the set of computer systems, information specifying one or more patterns associated with the plurality of reference beat frequencies;
- utilize the set of beat frequencies to determine whether the set of beat frequencies comport with the one or more patterns associated with the plurality of reference beat frequencies; and
- as a result of the set of beat frequencies not comporting with the one or more patterns, determine an indication of one or more anomalies in operation of the set of computer systems.

18. The non-transitory computer-readable storage medium of claim 16, wherein the instructions further cause the computer system to:
- obtain, from the profile of the set of computer systems, statistical data generated based at least in part on the plurality of reference beat frequencies specified within the profile; and
- analyze the set of beat frequencies using the statistical data to identify any anomalies in operation of the set of computer system.

19. The non-transitory computer-readable storage medium of claim 18, wherein the statistical data includes standard deviation values for the plurality of reference beat frequencies, variance values for the plurality of reference beat frequencies, and mean values for the plurality of reference beat frequencies.

20. The non-transitory computer-readable storage medium of claim 18, wherein the instructions further cause the computer system to update the statistical data based at least in part on the set of beat frequencies if no anomalies are identified for the set of computer systems.

* * * * *